United States Patent
Lee et al.

(10) Patent No.: US 12,547,349 B2
(45) Date of Patent: Feb. 10, 2026

(54) MEMORY MODULE WITH DOUBLE DATA RATE COMMAND AND DATA INTERFACES SUPPORTING TWO-CHANNEL AND FOUR-CHANNEL MODES

(71) Applicant: Rambus Inc., San Jose, CA (US)

(72) Inventors: Dongyun Lee, Sunnyvale, CA (US); Steven C. Woo, Saratoga, CA (US)

(73) Assignee: Rambus Inc., San Jose, CA (US)

( * ) Notice: Subject to any disclaimer, the term of this patent is extended or adjusted under 35 U.S.C. 154(b) by 10 days.

(21) Appl. No.: 18/794,161

(22) Filed: Aug. 5, 2024

(65) Prior Publication Data

US 2024/0393982 A1    Nov. 28, 2024

Related U.S. Application Data

(62) Division of application No. 17/832,802, filed on Jun. 6, 2022, now abandoned.

(60) Provisional application No. 63/215,852, filed on Jun. 28, 2021.

(51) Int. Cl.
  *G06F 3/06* (2006.01)
(52) U.S. Cl.
  CPC .......... *G06F 3/0659* (2013.01); *G06F 3/0604* (2013.01); *G06F 3/0634* (2013.01); *G06F 3/0679* (2013.01)
(58) Field of Classification Search
  None
  See application file for complete search history.

(56) References Cited

U.S. PATENT DOCUMENTS

| | | |
|---|---|---|
| 6,742,098 B1 | 5/2004 | Halbert et al. |
| 7,062,597 B2 | 6/2006 | Perego et al. |
| 7,356,639 B2 | 4/2008 | Perego et al. |
| 7,363,422 B2 | 4/2008 | Perego et al. |
| 7,729,151 B2 | 6/2010 | Tsern et al. |
| 7,899,983 B2 | 3/2011 | Gower et al. |
| 8,028,144 B2 | 9/2011 | Hampel et al. |
| 8,065,475 B2 | 11/2011 | Gervasi |
| 9,025,409 B2 | 5/2015 | Shaeffer |
| 9,653,146 B2 | 5/2017 | Ware et al. |
| 9,666,250 B2 | 5/2017 | Shaeffer |

(Continued)

OTHER PUBLICATIONS

Cilku, Bekim et al., "A Memory Arbitration Scheme for Mixed-Criticality Multicore Platforms", Conference: 2nd International Workshop on Mixed Criticality Systems at the Real Time Systems Symposium (RTSS 2014), Dec. 2014. 6 pages.

(Continued)

*Primary Examiner* — Stephanie Wu
(74) *Attorney, Agent, or Firm* — Silicon Edge Law Group LLP; Arthur J. Behiel

(57) ABSTRACT

A memory module supports multiple memory channel modes, each including a double-date-rate (DDR) data channel supported by an independent command-and-address (CA) channel. In a two-channel mode, the memory module supports two DDR data channels using two respective DDR CA channels. Each CA channel includes a corresponding set of CA links. In a four-channel mode, the memory module supports two pairs of DDR data channels, each pair supported by a pair of independent CA channels. Memory commands issued in the four-channel mode are time interleaved to share one of the sets of CA links.

10 Claims, 4 Drawing Sheets

(56) References Cited

U.S. PATENT DOCUMENTS

| | | | |
|---|---|---|---|
| 9,734,112 B2 | 8/2017 | Gopalakrishnan et al. | |
| 9,792,965 B2 | 10/2017 | Best et al. | |
| 10,014,047 B2 | 7/2018 | Ware et al. | |
| 10,146,711 B2 | 12/2018 | Nale et al. | |
| 10,223,299 B2* | 3/2019 | Ware | G06F 13/00 |
| 10,235,242 B2 | 3/2019 | Wright et al. | |
| 10,339,999 B2 | 7/2019 | Ware et al. | |
| 10,360,972 B2 | 7/2019 | Ware et al. | |
| 10,789,185 B2 | 9/2020 | Giovannini et al. | |
| 10,866,916 B2 | 12/2020 | Amirkhany et al. | |
| 2009/0198924 A1 | 8/2009 | Shaeffer et al. | |
| 2010/0262790 A1 | 10/2010 | Perego et al. | |
| 2013/0033954 A1 | 2/2013 | Shaeffer | |
| 2014/0149775 A1* | 5/2014 | Ware | G06F 1/3278 |
| | | | 713/323 |
| 2014/0325105 A1 | 10/2014 | Prete et al. | |
| 2016/0203848 A1 | 7/2016 | Shaeffer | |
| 2017/0147263 A1 | 5/2017 | Shaeffer | |
| 2017/0337144 A1* | 11/2017 | Ware | G06F 13/1678 |
| 2018/0053544 A1 | 2/2018 | Ware et al. | |
| 2018/0061478 A1* | 3/2018 | Vergis | G11C 7/1045 |
| 2019/0096459 A1* | 3/2019 | Son | G06F 3/0659 |
| 2020/0075079 A1 | 3/2020 | Kim et al. | |

OTHER PUBLICATIONS

Kinsley, Tom et al., "DDR3 High Density DIMMs and 3DS", Micron Technology, Server Memory Forum 2011. 36 pages.

Wang, Yao et al., "Timing Channel Protection for a Shared Memory Controller", IEEE 20th International Symposium on High Performance Computer Architecture (HPCA), 2014, pp. 225-236. 12 pages.

* cited by examiner

MEMORY MODULE WITH DOUBLE DATA RATE COMMAND AND DATA INTERFACES SUPPORTING TWO-CHANNEL AND FOUR-CHANNEL MODES

TECHNICAL FIELD

The subject matter presented herein relates generally to high-speed electronic signaling in support of memory access.

BACKGROUND

A "server" is a computer that processes requests and delivers data to client computers over a network. For example, web servers allow Internet browsers on client computers to access web pages and other data via the Internet.

Servers include processing units that write and read data to and from memory coupled to the processing units via memory channels. A single memory channel includes a data pathway for transmitting and receiving data and a command pathway for transmitting and receiving commands and addresses. For example, a processing unit might write data to an address in memory by transmitting a write command with a target address over the command pathway and the write data over the data pathway. The data can later be read from memory by transmitting a read command with the target address over the command pathway and awaiting receipt of the data over the data pathway.

Modern servers are fantastically complex, with many processing units being served by an even larger number of memory ICs and memory channels. Processing units and collections of processing units can run many processes simultaneously, and each process can be further divided into threads. Each thread is a unit of execution that can be managed independently, essentially dividing a larger process into smaller chunks or tasks that can be acted on concurrently over respective memory channels for dramatically improved speed performance.

Maximizing performance is not a simple exercise in thread and channel proliferation, however, because server workload is not a simple function of the number of threads. For a given memory capacity, increasing the number of memory channels can reduce the throughput of each channel, slowing the performance of processes that require relatively high channel throughput.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
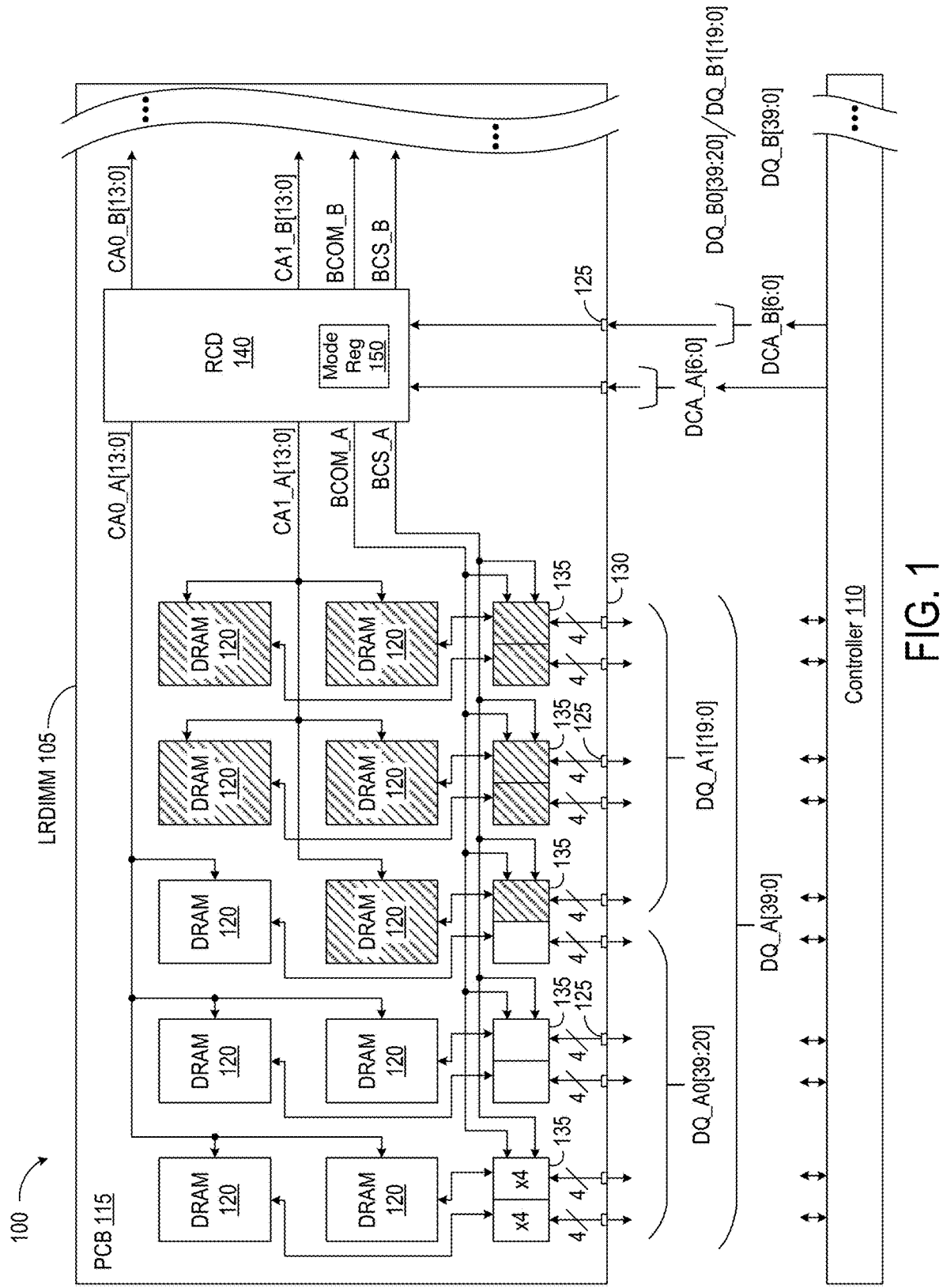
FIG. 1 depicts a memory system 100 in which a memory module 105 serves a memory controller 110 in either a two-channel mode or a four-channel mode, in either case with each channel having independent command and data pathways.

FIG. 1 depicts a memory system 100 in which a memory module 105 serves a memory controller 110 in either a two-channel, wide-data mode or a four-channel, narrow-data mode. In either mode, each channel supports independent command and data pathways. The number of available channels can thus be optimized for different numbers of threads in combination with memory capacity and bandwidth. The independent channels also allow secure sharing of memory resources among programs deployed by mutually mistrusting parties.

Memory module 105 is a load-reduced, dual inline memory module (LRDIMM) in this embodiment, a printed-circuit board (PCB) 115 with two horizontal rows of memory components 120 on either side. "Dual inline" refers to electrical connections 125 that run along both size of the bottom edge of PCB 115 to form a module connector 130 with two host-side module command ports DCA_A[6:0] and DCA_B[6:0] and four sets of module data ports DQ_A0[39:20], DQ_A1[19:0], DQ_B0[39:20], and DQ_B1[19:0] supporting like-identified links to controller 110, the host in this example. A collection of data buffers 135 communicates data signals between controller 110 and multiple memory components 120. The resulting reduction on the number of data interfaces reduces the load on controller 110 and is responsible for the "load-reduced" naming convention. A registered clock driver (RCD) 140, sometimes called an address-buffer integrated circuit, similarly manages command, address, and clock signals from module command ports DCA_A[6:0] and DCA_B[6:0] to reduce signal loading and distribute command and address signals as needed to collections of memory components 120 via four secondary command/address (CA) ports CA0_A[13:0], CA1_A[13:0], CA0_B[13:0], and CA1_B[13:0] serving like-identified links to memory components 120. Secondary, memory-side command ports CA0_A[13:0] and CA1_A[13:0] are each coupled to five memory components 120, three in one row and two in the other, on each side of PCB 115. The opposite side of PCB 115 is omitted for ease of illustration. Memory-side command ports CA0_B[13:0] and CA1_B[13:0] are each likewise connected to ten memory components each, five on each side of PCB 115, but those too are omitted from FIG. 1.

Module 105 supports a two-channel mode in which controller 110 communicates with module 105 via two independent memory channels. A memory channel on the left of module 105 is served by command/address (CA) channel DCA_A[6:0] and a data channel DQ_A[39:0] that combines module data ports DQ_A0[39:20] and DQ_A1[19:0] for a data width of forty. The other memory channel, not shown, is served by identical resources on the right side of module 105, including a command/address channel DCA_B[6:0] and a data channel DQ_B[39:0]. This two-channel mode is selected when controller 110 issues an instruction to load a mode register 150 with a value indicative of the two-channel mode.

Each memory component 120 can have multiple independently accessible memory dies, or chips, a stack of dynamic, random-access memory (DRAM) chips in this embodiment. Memory components 120 are designed to respond to commands that communicate values to a set of inputs within the DRAM chips. Common and well-understood DRAM commands include e.g., activate, precharge, read, write, and refresh. In the example of FIG. 1, RCD 140 intermediates between controller 110 and memory components 120. To distinguish between commands to and from RCD 140, which can be formatted the same or differently, host-side memory commands from controller 110 to RCD 140 are termed "primary memory commands" or "host commands" and memory commands from RCD 140 to memory components 120 are termed "secondary memory commands" or just "memory commands."

In the two-channel mode, controller 110 issues commands via CA channel DCA_A[6:0] to access a rank of ten DRAM chips, one in each of ten memory components 120 on one side of PCB 115. RCD 140 responds by sending the appropriate command and address signals to ten memory components 120 via secondary command interfaces CA0_A[13:0] and CA1_A[13:0], asserting a chip-select signal to one DRAM chip in each component 120 to select a rank of ten DRAM chips for read or write access to specified address locations. RCD 140 also controls data buffers 135, via control signals BCOM_A and BCS_A, to communicate forty data signals DQ_A[39:0], eight per data buffer 135, on behalf of the selected rank. Data signals are conveyed in sixteen-bit bursts in this example, with each memory transaction communicating 640 bits (40×16b), or 80 eight-bit bytes. The data to be written to or read from memory can be 64 bytes, leaving the remaining sixteen bytes for error detection and correction (EDC). Controller 110 can likewise issue commands via the right-side CA channel DCA_B[6:0] to access a rank of memory devices on the right half of module 105. The left and right channels are independent, meaning that the two channels can communicate data at the same or different times in the same or different directions.

Controller 110 can load register 150 with a mode value that places module 105 in a four-channel mode that allows controller 110 to communicate with module 105 via four independent and relatively narrow memory channels. Two of four channels, each of data width twenty, timeshare module command port DCA_A[6:0] by interleaving commands and addresses. RCD 140 deinterleaves the interleaved commands, directing each to a subset of five DRAM dies on respective memory components 120 via either secondary command interface CA0_A[13:0] or CA1_A[13:0] and controlling data buffers 135 to manage the corresponding flow of data signals. Data signals are communicated at width of twenty in 32-bit bursts in the four-channel mode. Should RCD 140 issue a read command via secondary command interface CA1_A[13:0], for example, the five memory components 120 highlighted with shading would deliver 640 bits (20×32b) of read data to controller 110. Controller 110 can likewise issue commands to access the three remaining sets of five memory components 120 on the front side of PCB 115 and the four on the back. All four channels are independent, meaning that module data ports DQ_A0[39:20], DQ_A1[19:0], DQ_B0[39:20], and DQ_B1[19:0] can communicate data at the same or different times in the same or different directions.

Figure 2:
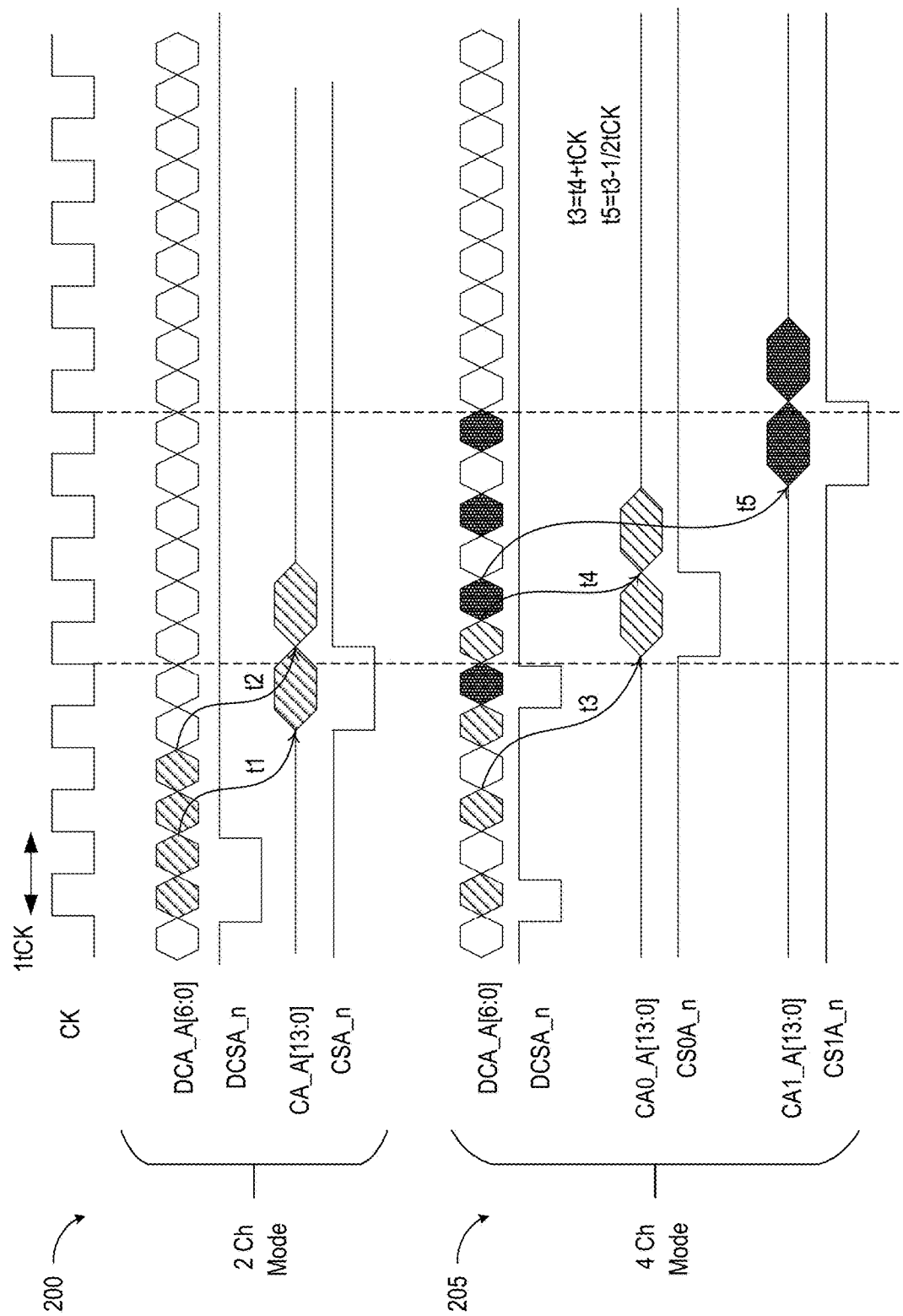
FIG. 2 includes a timing diagram 200 of module 105 in the two-channel mode and a timing diagram 205 for module 105 in the four-channel mode.

FIG. 2 includes two timing diagrams for command timing in memory system 100 of FIG. 1, a timing diagram 200 of module 105 in the two-channel mode and a timing diagram 205 for module 105 in the four-channel mode. A periodic clock signal CK with clock period 1tCK synchronizes timing for both modes.

Beginning with the two-channel mode of diagram 200, controller 110 issues commands to module command port DCA_A[6:0] as a sequence of four seven-bit symbols on successive rising and falling edges of clock signal CK. A primary chip-select signal DCSA_n ("n" for active low) is asserted for one clock period 1tCK, or just tCK. As is well known, CA signals convey command and address signals (e.g., a write command directing that data be written to a specified memory address) and chip-select signals to select one or a set of memory dies, or chips, out of several that share a common data bus. The signals conveyed over module interfaces DCA_A[6:0] and DCSA_n thus specify what is to be done (read or write) with particular addresses in a select set of memory dies within memory components 120.

RCD 140 controls memory components 120 on behalf of controller 110 in response to the primary CA and chip-select signals, imposing delays depicted as equivalent and successive time intervals t1 and t2 staggered by one clock period tCK. RCD 140 doubles the width of the CA signals, from seven to fourteen, and issues the wider but otherwise similar commands and addresses as secondary signals CA_A[13:0] (both CA0_A[13:0] and CA1_A[13:0] in FIG. 1) to control a rank of ten memory ICs, one in each of memory components 120. RCD 140 asserts a secondary chip-select signal CSA_n to select the sought-after rank of chips. RCD 140, though not shown in diagram 200, also controls all five data buffers 135 on the left side of module 105 to communicate data of width forty with the selected ten-chip rank. The burst length is 16 bits so access granularity is 640 bits per channel. The second channel, shown to include module CA port DCA_B[6:0] and module data port DQ_B[39:0] in FIG. 1, functions identically to but independent from the other channel.

Turning to diagram 205, in the four-channel mode controller 110 issues commands for two secondary CA interfaces CA0_A[13:0] and CA1_A[13:0] using a single module CA port DCA_A[6:0]. Commands to secondary CA port CA0_A[13:0] (CA1_A[13:0]) are conveyed to module 105 via module CA port DCA_A[6:0] as a sequence of four seven-bit symbols on successive rising (falling) edges of clock signal CK. A primary chip-select signal DCSA_n is asserted for half of period tCK for each secondary command. Interleaving commands on module CA interface DCA_A[6:0] halves the CA bandwidth for each channel sharing the same CA links.

RCD 140 controls memory components 120 on behalf of controller 110 in response to the module CA and chip-select signals from controller 110. As in the two-channel mode, RCD 140 doubles the CA width, from seven to fourteen, and issues the wider but otherwise similar commands and addresses as secondary signals. In the four-channel mode, however, each of the two types of time-interleaved commands, those conveyed on rising clock edges versus those conveyed on the falling clock edges, are conveyed on respective secondary CA ports CA0_A[13:0] and CA1_A[13:0]. RCD 140 imposes different delays t3 and t4 on each combined pair of primary command signals, where t3 is the sum of t4 and clock period tCK, to provide successive commands on the secondary command interfaces. Having conveyed a command on one secondary CA interface, RCD 140 can present command and address signals on another secondary CA interface after a delay t5 of that is a half clock cycle (tCK/2) shorter than delay t3.

Figure 3:
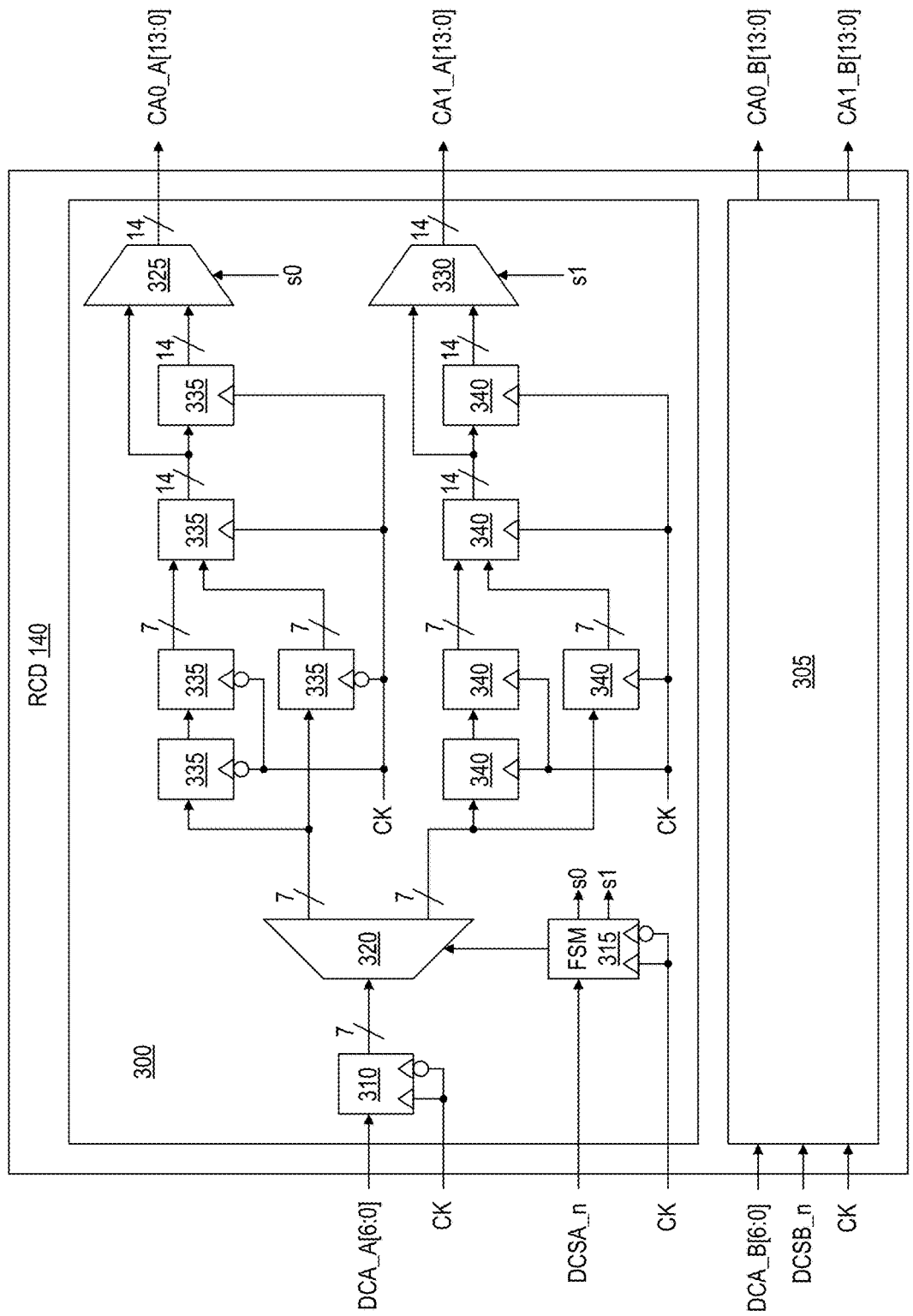
FIG. 3 depicts RCD 140 of FIG. 1 in accordance with one embodiment.

FIG. 3 depicts RCD 140 of FIG. 1 in accordance with one embodiment. RCD 140 includes two physically similar CA circuits 300 and 305, each of which supports two channels, for a total of four, in the four-channel mode. CA circuits 300 and 305 are operationally identical so a discussion of circuit 305 is omitted for brevity.

CA circuit 300 receives double-data-rate (DDR) signals via primary command port DCA_A[6:0] and communicates them as single-data-rate (SDR) signals on secondary CA ports CA0_A[13:0] and CA1_A[13:0]. In this context, the term "data" in "data rate" refers not to the information conveyed to and from memory, but to whatever signals (e.g. commands and addresses) are conveyed over the primary and secondary CA ports and their associated interfaces. DDR and SDR are terms of art in computing, with DDR referring to the transmission of information in synchronization with both rising and falling clock edges and SDR referring to the transmission of information only one edge type. The depiction of CA circuit 300 omits multiplexing circuitry that converts DDR signals to SDR signals in support of channel in the two-channel mode in which both secondary CA interfaces CA0_A[13:0] and CA1_A[13:0] work in lock step to control a rank of ten DRAM dies.

CA circuit 300 includes a DDR flip-flop 310 that samples command/address signals on rising and falling edges of clock signal CK. A DDR finite state machine (FSM) 315 controls a demultiplexer 320 and a pair of multiplexers 325 and 330 to manage the flow of signals between the primary and secondary command ports. A collection of SDR flip flops 335 manages the flow of the half of the interleaved DDR signals that are conveyed on falling clock edges, presenting them as full-width SDR signals at multiplexer 325 for presentation on secondary command interface CA0_A[13:0]. A second collection of SDR flip flops 340 manages the flow of the half of the interleaved DDR CA signals that are conveyed on rising clock edges, presenting them as full-width SDR signals at multiplexer 330 for presentation on secondary command port CA1_A[13:0].

Figure 4:
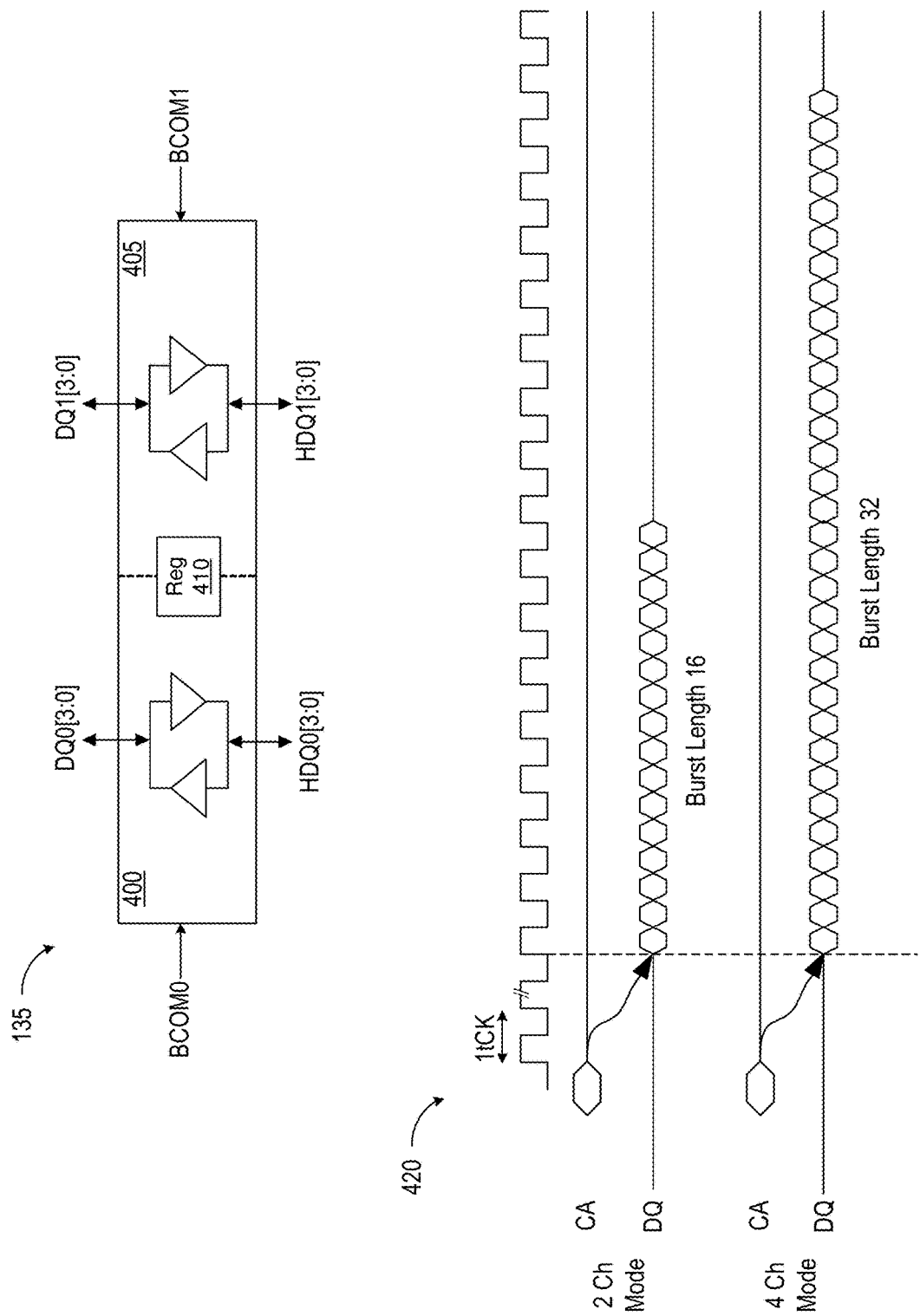
FIG. 4 depicts a data buffer 135 and a timing diagram 420 depicting the flow of data symbols therethrough in both two-channel and four-channel modes.

FIG. 4 depicts a data buffer 135 in accordance with one embodiment. Buffer 135 includes two similar halves 400 and 405, each of which is bidirectional with a data width of four-bits, which is to say each half can communicate four data signals in parallel in either direction in support of data transactions for writing to and reading from memory. Each of two four-bit memory-side data links DQ0[3:0] and DQ1[3:0] connects to a pair of memory components 120, one on each side of PCB 115. Each of two four-bit host-side data links HDQ0[3:0] and HDQ1[3:0] extends to module connector 130 in service of four of the data connections associated with primary data interfaces DQ_A[39:0] and DQ_B[39:0].

Each of data-buffer halves 400 and 405 can be managed independently via respective command signals BCOM0 and BCOM1 from RCD 140, or can be managed collectively responsive to the same command signals BCOM0 or by providing the same information to links BCOM0 and BCOM1 to communicate data of width eight. A mode register 410 can be integrated into data buffer 135 to select between these narrow and wide data modes, in which case register 410 can be loaded by host 110 directly or via RCD 140. Though not shown, data buffers 135 can additionally communicate single-ended or differential strobes, clock signals, clock-enable signals, on-die-termination (ODT) control signals, etc., as needed to facilitate data transfers to and from memory. Data buffers 135 can be omitted in some embodiments, and the DRAM dies can be register programmable to offer host-programmable mode selection.

A timing diagram 420 depicts the flow of data symbols in the two-channel mode and the four-channel mode from the perspective of memory components 120. In the two-channel mode, in which case each channel has a data width of forty, DDR data symbols are communicated in bursts of sixteen symbols to provide an access granularity of 40×16b=640b, 64 bytes of data and 16 bytes of EDC information. In the four-channel mode, in which case each channel has a data width of twenty, the access granularity is still 640b because the DDR data symbols are communicated in bursts of thirty-two symbols (20×32b=640b). Per-channel access granularity and memory bandwidth are thus preserved in the four-channel mode, though the increased burst length increases read and write latency.

Returning to FIG. 1, controller 140 can represent a combination of hardware and software running one or more virtual machines. In some embodiments, a "hypervisor," also called a "virtualizer," of a virtual machine manages the execution of an operating system. A virtual machine can send a memory configuration request to a hypervisor, which may respond by configuring a memory map with a select two-channel or four-channel mode for modules in main memory. In some embodiments, the virtual machine can monitor a measure of performance and select between modes accordingly. In other embodiments, a human or software administrator can select between modes programmatically, or modes can be selected in hardware during or subsequent to the manufacture of the module or module components.

While the present invention has been described in connection with specific embodiments, after reading this disclosure variations of these embodiments will be apparent to those of ordinary skill in the art. For example, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A memory module comprising:
    a module connector having a first module command port, a second module command port, and first, second, third, and fourth module data ports;
    an address-buffer component having a first primary command port coupled to the first module command port, a second primary command port coupled to the second module command port, and first, second, third, and fourth secondary command ports;
    four sets of dynamic, random-access memory (DRAM) ICs, including:
        a first set of DRAM ICs having a first DRAM command port coupled to the first secondary command port and a first DRAM data port coupled to the first module data port;
        a second set of DRAM ICs having a second DRAM command port coupled to the second secondary command port and a second DRAM data port coupled to the second module data port;
        a third set of DRAM ICs having a third DRAM command port coupled to the third secondary command port and a third DRAM data port coupled to the third module data port; and
        a fourth set of DRAM ICs having a fourth DRAM command port coupled to the fourth secondary command port and a fourth DRAM data port coupled to the fourth module data port; and
    a mode register to store a first mode value to control the address-buffer component to time multiplex first and second memory commands to the first module command port, directing the first memory commands to the first DRAM command port and the second memory commands to the second DRAM command port.

2. The memory module of claim 1, the first mode value to further control the address-buffer component to time multiplex third and fourth memory commands to the second module command port, directing the third memory commands to the third DRAM command port and the fourth memory commands to the fourth DRAM command port.

3. The memory module of claim 2, wherein the address-buffer component receives a clock signal having alternating rising and falling clock edges, the address-buffer component to time the third memory commands to the rising clock edges and the fourth memory commands to the falling clock edges.

4. The memory module of claim 1, the mode register to store a second mode value to control the address-buffer component to direct third memory commands from the first module command port to the first and second DRAM command ports and fourth memory commands from the second module command port to the third and fourth DRAM command ports.

5. The memory module of claim 1, further comprising data-buffer components communicatively coupled between the four sets of DRAM ICs and the module data ports, wherein a first of the data-buffer components is communicatively coupled between the first module data port and the first set of DRAM ICs, a second of the data-buffer components is communicatively coupled between the second module data port and the second set of DRAM ICs, and a third of the data-buffer components is communicatively coupled between both the first and second module data ports and both the first and second sets of DRAM ICs.

6. The memory module of claim 5, wherein the third data-buffer component comprises two bidirectional data buffers, each of data buffers having a data width of four bits and independently controlled responsive to the first mode value.

7. The memory module of claim 6, the mode register to store a second mode value, the two bidirectional data buffers managed collectively responsive to the second mode value to provide a second data width of eight bits.

8. The memory module of claim 7, wherein the bidirectional data buffers communicate data of a first burst length responsive to the first mode value and a second burst length responsive to the second mode value.

9. The memory module of claim 1, wherein the DRAM ICs are arranged in a first row of DRAM ICs and a second row of DRAM ICs, and wherein at least one of the first, second, third, and fourth secondary command port is coupled to ones of the DRAM ICs in both the first and second rows of DRAM ICs.

10. The memory module of claim 9, wherein each of the first, second, third, and fourth secondary command port is coupled to ones of the DRAM ICs in both the first and second rows of DRAM ICs.

* * * * *